(12) United States Patent
Bartminn

(10) Patent No.: US 10,184,260 B2
(45) Date of Patent: Jan. 22, 2019

(54) TRANSITION PIECE FOR WIND TURBINES AND CONNECTING STRUCTURES

(71) Applicant: INNOGY SE, Essen (DE)

(72) Inventor: Daniel Bartminn, Elmshorn (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 15/513,145

(22) PCT Filed: Sep. 16, 2015

(86) PCT No.: PCT/EP2015/071238
§ 371 (c)(1),
(2) Date: Mar. 21, 2017

(87) PCT Pub. No.: WO2016/046046
PCT Pub. Date: Mar. 31, 2016

(65) Prior Publication Data
US 2017/0298647 A1   Oct. 19, 2017

(30) Foreign Application Priority Data
Sep. 25, 2014  (DE) ........................ 10 2014 219 482

(51) Int. Cl.
*E04H 12/10*  (2006.01)
*F03D 13/20*  (2016.01)
(Continued)

(52) U.S. Cl.
CPC ......... *E04H 12/10* (2013.01); *E02B 17/0004* (2013.01); *F03D 13/22* (2016.05);
(Continued)

(58) Field of Classification Search
CPC ................ E04H 12/22; E04H 12/2238; E04H 2012/006; E04H 12/34; E04H 12/2269;
(Continued)

(56) References Cited

U.S. PATENT DOCUMENTS 5,291,709 A * 3/1994 Vranjesevic ........ E04H 12/2276
248/523
9,188,317 B1 * 11/2015 Bryant ................ E04H 12/2269
(Continued)

FOREIGN PATENT DOCUMENTS

EP    1813808 A2   8/2007
EP    2072685 A1   6/2009
(Continued)

OTHER PUBLICATIONS

International Search Report and Written Opinion, dated Nov. 26, 2015, issued in International Patent Application No. PCT/EP2015/071238, filed Sep. 16, 2015.
(Continued)

*Primary Examiner* — Phi D A
(74) *Attorney, Agent, or Firm* — Wiley Rein LLP

(57) ABSTRACT

The present invention discloses a transition piece (10) for connecting a first component (20) having at least three columns (21) to a tower-shaped second component (30), wherein the transition piece (10) can be arranged between the first component (20) and the second component (30) and comprises a connection device for connecting the second component 30. The transition piece (10) is characterized in that it has at least three curved elements (11), the respective legs (13) of which are connectable at least indirectly to the first component (20). Each curved element (11) can be brought into direct contact with the second component (30) by means of convex end sections (14) arranged between the respective legs (13). In this way, the convex end sections (14) of the curved elements (11) form a receiving region (15) of the transition piece (11) and the second component (30) can be inserted into this receiving region.

25 Claims, 1 Drawing Sheet

(51) Int. Cl.
 *F03D 13/25* (2016.01)
 *E02B 17/00* (2006.01)
 *E04H 12/00* (2006.01)
(52) U.S. Cl.
 CPC ...... *F03D 13/25* (2016.05); *E02B 2017/0091* (2013.01); *E04H 2012/006* (2013.01); *F03D 13/20* (2016.05); *F05B 2240/9121* (2013.01); *F05B 2240/95* (2013.01); *Y02B 10/30* (2013.01); *Y02E 10/728* (2013.01)
(58) Field of Classification Search
 CPC . E04H 12/2276; E04H 12/2292; E04H 12/24; E04H 12/36; E02B 2017/0004; E02B 17/027; E02B 2017/006; E02B 17/0004; E02B 2017/0091; Y02E 10/727; Y02E 10/728; F03D 11/045; F03D 13/22; F05B 2240/95; E04B 1/40; E04B 1/41; E02D 27/425; E02D 27/42
 See application file for complete search history.

(56) References Cited

U.S. PATENT DOCUMENTS

| | | | | |
|---|---|---|---|---|
| 2004/0051021 A1* | 3/2004 | Micheel | ............... | G10D 13/026 248/346.01 |
| 2005/0028478 A1* | 2/2005 | Kondo | ................. | E04B 1/2403 52/831 |
| 2007/0243063 A1 | 10/2007 | Schellstede | | |
| 2011/0146192 A1* | 6/2011 | Foss | ........................ | F03D 13/20 52/651.01 |
| 2012/0023860 A1* | 2/2012 | Voss | ........................ | F03D 13/20 52/651.09 |
| 2014/0115987 A1* | 5/2014 | Rodriguez Tsouroukdissian | ........ | E02D 27/42 52/298 |
| 2014/0133921 A1 | 5/2014 | Wu et al. | | |
| 2015/0314834 A1* | 11/2015 | Prats Mustaros | ....... | B63B 21/50 405/223.1 |
| 2017/0152641 A1* | 6/2017 | Serna Garc A-Conde | ................. | E04H 12/2269 |
| 2017/0292283 A1* | 10/2017 | Drewes | ................... | E04H 12/10 |

FOREIGN PATENT DOCUMENTS

| | | |
|---|---|---|
| EP | 2333163 A1 | 6/2011 |
| WO | 2013/029626 A1 | 3/2013 |
| WO | 2014/027212 A1 | 2/2014 |

OTHER PUBLICATIONS

International Preliminary Report on Patentability dated Apr. 6, 2017, in related International Patent Application No. PCT/EP2015/071238, filed Sep. 16, 2015.

* cited by examiner

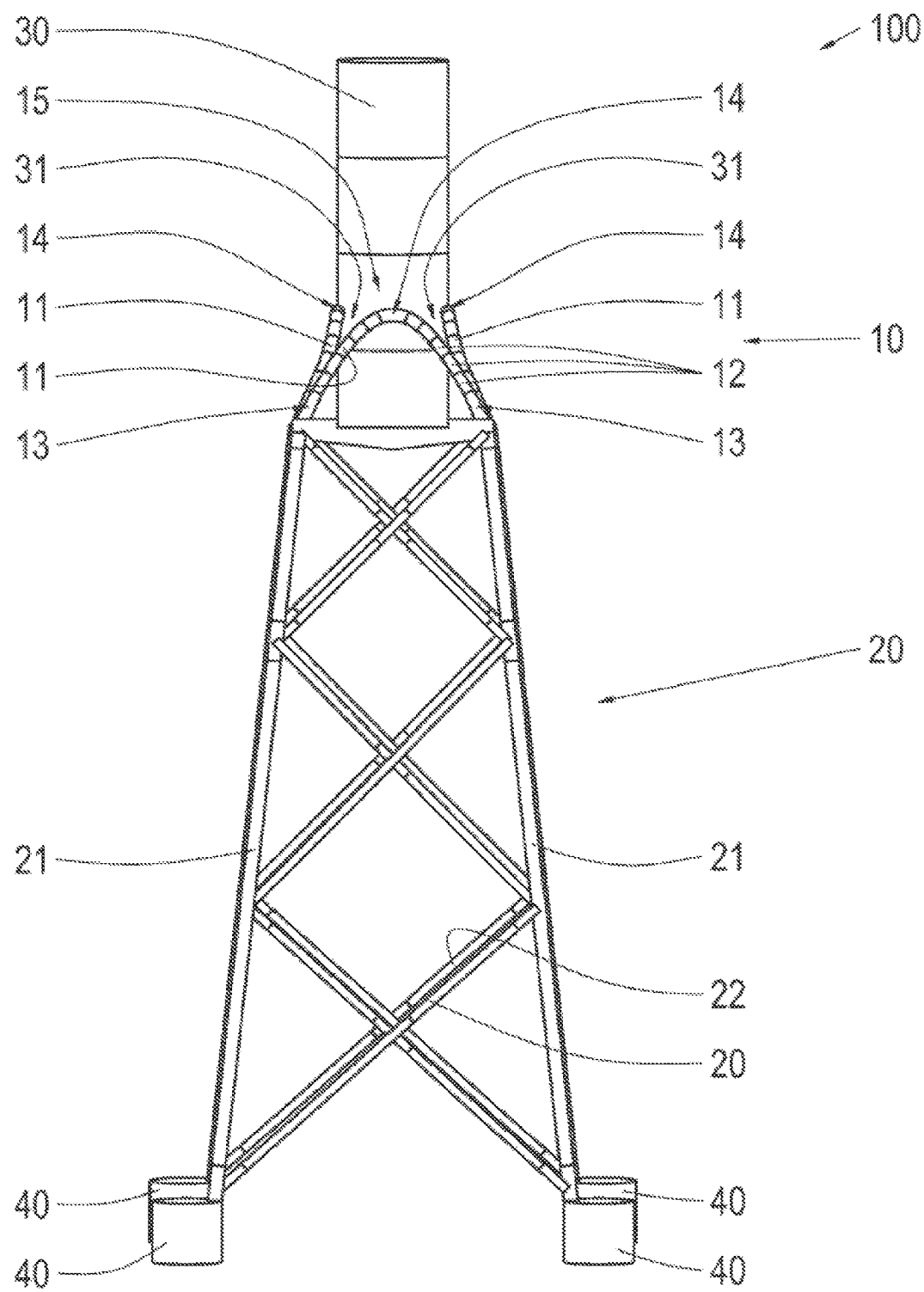

TRANSITION PIECE FOR WIND TURBINES AND CONNECTING STRUCTURES

RELATED APPLICATIONS

This Application is a § 371 National Phase entry of International Application No. PCT/EP2015/071238 filed Sep. 16, 2015, which claims priority benefit of Application No. DE 102014219482 filed Sep. 15, 2014, the entire contents of which are incorporated herein by reference for all purposes.

BACKGROUND OF THE INVENTION

The present invention relates to a transition piece for connecting a first component having at least three columns to a tower-shaped second component. The transition piece can be used particularly in wind power plant structures. The present invention also relates to a structure comprising a first component designed as a jacket and a second component designed as a tower. The present invention further relates to a structure comprising a first component designed as a connecting structure and a second component designed as a monopile. The present invention further relates to a structure comprising a first component designed as a connecting structure and a second component designed as a distributed-support structure or as a suction caisson or gravity foundation or tripod or triple.

EP2333163 discloses an offshore structure which comprises a transition piece for connecting a foundation structure comprising a plurality of columns (also termed a jacket) to a superstructure, such as a plant part of a wind turbine, a tower of a wind turbine or a substation. The transition piece comprises a cylindrical housing which is provided at its end side with a circular connecting flange having a plurality of screw openings. A connecting portion of the superstructure can be connected to the transition piece by means of the connecting flange. The transition piece is provided on the outer side with connecting plates which extend radially from the outer wall and parallel to the longitudinal center axis of the foundation structure and which are in each case connected to a column of the foundation structure. The columns each have recesses in which the connecting plates are accommodated, with the result that the foundation structure is connected to the transition piece.

In the case of the transition piece known from EP2333163, the entire weight of the superstructure (plant part of the wind turbine) or of the tower (of the wind turbine or of the substation) weighs down onto the connecting plates of the transition piece. High requirements are consequently placed on the connection of the connecting plates to the cylindrical main body of the transition piece; in particular, in the case of the connecting plates being welded to the cylindrical main body, the weld seams must withstand an enormous degree of loading. Furthermore, the superstructure (plant part of the wind turbine) or the tower (of the wind turbine or of the substation) is connected to the transition piece only via the connecting flange, and therefore the torques which result during swaying movements of the superstructure or of the tower must be absorbed by the connecting flange.

SUMMARY OF THE INVENTION

The object on which the present invention is based is the provision of a more stable transition piece for connecting a first component having at least three columns to a tower-shaped second component.

The object on which the present invention is based is achieved by a transition piece having the features of claim 1.

Furthermore, the object on which the present invention is based is the provision of a more stable structure which comprises a first component designed as a jacket and a second component designed as a tower.

This object is achieved by a structure having the features of claim 1.

In addition, the object on which the present invention is based is the provision of a more stable structure which comprises a first component designed as a connecting structure and a second component designed as a monopile. Alternatively, the second component can also be designed as a gravity foundation, as a distributed-support structure which is composed of a plurality of individual components, as a tripod, as a triple or as a caisson.

This object is achieved by a structure having the features of claim 8.

In more precise terms, the object on which the present invention is based is achieved by a transition piece for connecting a first component having at least three columns to a tower-shaped second component, wherein the transition piece can be arranged between the first component and the second component and comprises a connecting device for connecting the second component. The first component can be, for example, a foundation structure, in particular a jacket. The second component can be, for example, a tower of a wind turbine or of a substation. However, it is alternatively also possible that the first component is designed as a connecting structure, in particular as a substation, and that the second component is designed as a monopile. The transition piece according to the invention is characterized in that it comprises at least three arcuate elements whose respective legs can at least indirectly be connected to the first component. Here, the respective legs are preferably connected to corresponding ends of the columns of the first component. Furthermore, the respective arcuate elements can be brought into direct contact with the second component by means of convex end portions arranged between the respective legs. Here, the convex end portions of the arcuate elements form a receiving region of the transition piece, and the second component can be introduced into this receiving region.

The connecting device of the transition piece is preferably designed as a connecting flange. The receiving region which is formed by the arcuate elements can alternatively also be designated as a receiving funnel. Of course, the first component can also have more than three columns, with the result that the transition piece according to the invention is also suitable for a jacket, which usually has four columns or standing legs.

The transition piece according to the invention offers the advantage that it allows a more stable connection of the transition piece to the second tower-shaped component as compared with transition pieces known from the prior art. This is because the arcuate elements also serve as retaining and/or supporting elements for the tower-shaped second component, with the result that swaying movements of a structure, for example of an onshore wind turbine or of an offshore wind turbine, can be counteracted by means of the arcuate elements. The transition piece according to the invention further offers the advantage that the lateral forces exerted by the tower-shaped second component onto the arcuate elements are channeled off as axial forces via the legs of the arcuate elements to the columns of the first component. Lateral forces are therefore converted into axial forces by the arcuate elements, with the result that the axial forces can be channeled off in a particularly advantageous manner into the columns of the first component. Consequently, the transition piece according to the invention experiences reduced peak loading and therefore has increased long-term stability.

As a preference, the respective arcuate elements are of tubular design.

An appropriately designed transition piece can be produced particularly simply.

Moreover, a high stability of the transition piece is ensured without unnecessarily increasing the weight of the transition piece. The production costs of an appropriately designed transition piece are also reduced.

As a further preference, the respective arcuate elements are segmented and comprise interconnected cylinder segments.

By virtue of an appropriate design of the transition piece, it is possible to make use of cost-effective cylinder segments in order to produce the arcuate elements and the transition piece, with the result that the production costs of the transition piece are further reduced. Moreover, on account of being segmented, the arcuate elements can be adapted to different geometries of the tower-shaped second components.

The respective arcuate elements, in particular the legs of the respective arcuate elements, are preferably tilted in the direction of a longitudinal center axis of the transition piece. Here, axes of symmetry defined by the respective arcuate elements preferably overlap in the longitudinal center axis of the transition piece.

By virtue of an appropriate tilting of the arcuate elements or of the respective legs of the respective arcuate elements, lateral forces exerted by the tower-shaped second component onto the arcuate elements can be better absorbed and converted into axial forces. Therefore, a corresponding transition piece has a further increased stability.

As a further preference, the convex end portions of the respective arcuate elements can be brought to bear tangentially on the second component. On account of the convex end portions bearing tangentially on the second component, the bearing surface of the respective arcuate elements on the second component increases, with the result that forces from the tower-shaped second component can be better absorbed by the arcuate elements.

According to a further preferred embodiment, the convex end portions of the respective arcuate elements are arranged in a plane parallel to the longitudinal center axis of the transition piece.

The respective arcuate elements consequently hug the outer surface of the second component if the outer surface of the second component extends parallel to the longitudinal center axis of the transition piece. Consequently, a larger contact length of the arcuate elements with the second component is achieved, with the result that a structure having a transition piece according to the invention has increased stability.

In particular, it is also possible that the respective legs of the respective arcuate elements are tilted in the direction of the longitudinal center axis of the transition piece, and at the same time the convex end portions of the respective arcuate elements can be brought to bear tangentially on the second component or the convex end portions of the respective arcuate elements are arranged in a plane parallel to the longitudinal center axis of the transition piece. Therefore, the arcuate elements have, in addition to their arcuate curvature, a further convex curvature directed toward the longitudinal center axis.

The object on which the present invention is based is also achieved by a structure which comprises a first component designed as a jacket and a component designed as a tower. The component according to the invention is characterized in that the jacket is connected to the tower by means of a transition piece according to one of the above-described exemplary embodiments, wherein a connecting portion of the tower is arranged within the receiving region of the transition piece and is connected to the transition piece by means of the connecting device, and wherein the columns of the jacket are in each case at least indirectly connected to two legs of two adjacent arcuate elements of the transition piece.

The structure according to the invention can be a wind turbine structure, a wind turbine or a substation for wind turbines, in each case in an onshore configuration or offshore configuration. The jacket can generally also be designated as a foundation structure. The columns of the jacket can also be designated as standing legs.

A correspondingly designed structure is particularly stable since the transition piece can convert lateral movements of the tower into axial forces which are channeled off via the columns of the jacket. Furthermore, the structure offers the advantage that the lower region of the tower is still freely accessible on account of the arcuate elements, with the result that access openings can be provided at that location.

The object on which the present invention is based is also achieved by a structure which comprises a first component formed as a connecting structure and a second component designed as a monopile. The structure according to the invention is characterized in that the connecting structure is connected to the monopile by means of a transition piece according to one of the above-described exemplary embodiments, wherein a connecting portion of the monopile is arranged within the receiving region of the transition piece and is connected to the transition piece by means of the connecting device, and wherein the columns of the connecting structure are in each case at least indirectly connected to two legs of two adjacent arcuate elements of the transition piece.

The connecting structure can generally be a so-called topside, for example a substation. The columns of the connecting structure can also be designated as corner struts. The monopile is anchored in the ground or in the seabed.

Depressions corresponding to the shape of the arcuate elements are preferably formed on an outer surface of a connecting portion of the tower-shaped second component, with the result that the respective end portions of the arcuate elements are accommodated in the corresponding depressions.

By virtue of an appropriate design of the second tower-shaped component, the structure thus formed has increased stability since the contact surface or the contact area between the arcuate elements and the outer surface of the second component is increased.

An interspace between to mutually adjacent convex end portions and an outer surface of a connecting portion of the second component is preferably closed by a cladding.

By virtue of an appropriate cladding, the structure thus formed has increased streamlining, with the result that lateral movements of the structure, for example due to wind, are reduced. Overall, the stability of the structure is thereby increased even more.

At least one access opening for access into the second component (30) is preferably arranged in the tower-shaped second component situated within the receiving region of the transition piece.

This offers the advantage that the stability of the transition piece, and in particular of the structure, is not reduced in spite of the provision of an access opening, for example a door.

BRIEF DESCRIPTION OF THE DRAWING

Further advantages, details and features of the invention will emerge hereinbelow from the explained exemplary embodiment, in which specifically:

FIG. 1 shows a schematic illustration of a structure according to the invention comprising a first component designed as a jacket, a second component designed as a tower and a transition piece according to the invention for connecting the first component to the second component.

DETAILED DESCRIPTION

FIG. 1 shows a structure 100 designed as a wind turbine 100 and comprising a first component 20 and a second tower-like component 30. Here, the first component 20 is designed as a jacket 20 and the second component 30 is designed as a tower 30 of the wind turbine 100, the upper region of the wind turbine 100 having the nacelle and the rotor not being illustrated. As can be seen from FIG. 1, the jacket 20 comprises four columns 21 which are connected to one another and stabilized by means of cross struts 22. Here, the cross struts 22 extend between adjacent columns 21 and also between diagonally opposite columns 21. The lower ends of the columns 21 are connected to the foundation piles 40 which, in the case of an offshore wind turbine 100, can be installed in the seabed.

However, a different geometry of a jacket 20, which can generally also be designated as a foundation structure 20, is also conceivable. For example, a jacket 20 of a structure 100 according to the invention can also have only three columns 21 or else more than four columns 21.

A transition piece 10 is arranged between the jacket 20 and the tower 30, the transition piece 10 being designed to connect the jacket 20 to the tower 30. Although not visible in FIG. 1, the transition piece comprises a connecting device by means of which the transition piece 10 can be connected to the tower 30. This connecting device 30 is preferably designed as a connecting flange and is sufficiently well known from the prior art, which means that a corresponding description is not required.

It can also be seen from FIG. 1 that the transition piece 10 comprises four arcuate elements 11 whose respective legs 13 are connected to the jacket 20 and in particular to the columns 21 thereof. Here, each arcuate element 11 spans between in each case two mutually adjacent columns 21 such that each column 21 of the jacket 20 is therefore connected to in each case two legs 13 of two different arcuate elements 11. The respective arcuate elements 11 are in direct contact with the outer surface of the tower 30 by means of convex end portions 14 arranged between the respective legs 13. The convex end portions 14 of the arcuate elements 11 thus form a receiving region 15 of the transition piece 10, and the tower 30 is introduced into this receiving region. The convex end portions 14 can also be designated as retaining portions 14 of the arcuate elements 11.

Owing to the provision of the arcuate elements 11, lateral movements of the tower 30 are absorbed by the respective arcuate elements 11 and converted into axial forces which are channeled off by the legs 13 into the columns 21 of the jacket 20. Consequently, swaying movements of the tower 30 are reduced, with an advantageous introduction of force into the columns 21 of the jacket 20 being achieved, without connection points, for example welded connections, between the transition piece 10 and the jacket 20 being exposed to excessive forces.

As can also be seen from FIG. 1, the respective arcuate elements 11 comprise a plurality of interconnected cylinder segments 12 which are preferably welded to one another to form the respective arcuate elements 11. Consequently, the arcuate elements 11 are of tubular design.

It can also be seen from FIG. 1 that the respective legs 13 of the respective arcuate elements 11 are tilted in the direction of a longitudinal center axis of the transition piece 10. By contrast, the convex end portions 14 of the respective arcuate elements 11 bear tangentially on the outer surface of the tower 30 and, in the exemplary embodiment illustrated in FIG. 1, are arranged in a plane parallel to the longitudinal center axis of the transition piece 10.

Because of this, there is obtained a larger contact region between the arcuate elements 11 and the tower 30, thereby allowing improved force transmission from the tower 30 to the arcuate elements 11.

Although not visible in FIG. 1, depressions corresponding to the shape of the convex end portions 14 are provided on the outer surface of a connecting portion of the tower 30 that is connected to the arcuate elements 11, with the result that the respective convex end portions 14 of the arcuate elements 11 are arranged in the depressions. Because of this, there is obtained a further increased contact surface between the arcuate elements 11 and the tower 30, with the result that forces exerted onto the tower 30 can be dissipated even better via the arcuate elements 11 into the columns 21 of the jacket 20.

LIST OF REFERENCE SIGNS

10 Transition piece
11 Arcuate element
12 Cylinder segment
13 Leg (of the arcuate element)
14 Convex end portion (of the arcuate element)
15 Receiving region
20 First component/jacket/connecting structure
21 Column of the jacket/standing leg of the jacket
22 Cross strut (of the jacket)
30 Second component/tower/monopile
31 Interspace
40 Foundation pile

The invention claimed is:

1. A structure comprising a jacket component having at least three columns and a tower component, wherein the jacket component is configured to connect to the tower component by means of a transition piece, wherein
the transition piece for connecting the jacket component to the tower component configured to attach atop the jacket component and extend vertically upward therefrom, wherein the transition piece is configured to be positioned between the jacket component and the tower component and wherein the transition piece comprises a connecting device, which further comprises at least three arcuate elements, wherein each arcuate element comprises two legs with a convex portion positioned therebetween, wherein the legs of each arcuate element are configured to connect directly or indirectly to the jacket component, and wherein the respective arcuate elements can be brought into direct contact with the tower component by means of the convex portions thereof, and wherein the convex portions of the at least three arcuate elements form a receiving region of the transition piece for receiving the tower component; and the tower component comprises a connecting portion configured for placement within the receiving region of the transition piece and for connection to the transition piece by means of connecting device of the transition piece, and wherein the respective columns of the jacket component are in each case connected directly or indirectly to two legs of two adjacent arcuate elements of the transition piece.

2. A structure comprising (a) connecting structure with at least three columns, and (b) a monopile having a connecting portion, wherein the connecting structure engages with the monopile via a transition piece, wherein the transition piece for connecting the connecting structure to the monopile configured to attach atop the connecting structure and extend vertically upward therefrom, wherein the transition piece is configured to be positioned between the connecting structure and the monopile and wherein the transition piece comprises a connecting device, which further comprises at least three arcuate elements, wherein each arcuate element comprises two legs with a convex portion positioned therebetween, wherein the legs of each arcuate element are configured to connect directly or indirectly to the connecting structure, and wherein the respective arcuate elements can be brought into direct contact with the monopile by means of the convex portions thereof; and wherein the convex portions of the at least three arcuate elements form a receiving region of the transition piece for receiving the monopile; and the connecting portion of the monopile is configured to be disposed within the receiving region of the transition piece and configured to be connected to the transition piece by means of the connecting device of the transition piece, and wherein the columns of the connecting structure are configured to connect directly or indirectly to two legs of two adjacent arcuate elements of the transition piece.

3. The structure of claim 1, wherein the connecting portion of the tower component further comprises an outer surface comprising complementary depressions corresponding to the shape of the arcuate elements, with the result that the respective convex portions of the arcuate elements can be accommodated in the corresponding depressions.

4. The structure of claim 1, wherein the transition piece further comprises a cladding for closing an interspace between mutually adjacent convex portions of the arcuate elements and an outer surface of the tower component.

5. The structure of claim 1, wherein the tower further comprises at least one access opening for access into the tower situated within the receiving region of the transition piece.

6. The structure of claim 1, wherein the jacket component comprises at least three columns, and the legs of the arcuate elements are configured to connect directly or indirectly with the columns of the jacket component.

7. The structure of claim 1, wherein the connecting device is a connecting flange.

8. The structure of claim 1, wherein an interspace between mutually adjacent convex portions of the arcuate elements and outer surfaces of the connecting portion of the tower component is closed by a cladding.

9. The structure of claim 2, wherein the connecting portion of the monopile further comprises an outer surface comprising complementary depressions corresponding to the shape of the arcuate elements, such that the respective convex portions of the arcuate elements can be accommodated in the corresponding depressions of the monopile.

10. The structure of claim 2, wherein the monopile further comprises at least one access opening situated in the connecting portion of the monopile within the receiving region of the transition piece, wherein said access opening provides access into the monopile.

11. The structure of claim 1, wherein the legs of the respective arcuate elements are tilted radially inward in the direction of a longitudinal center axis of the transition piece.

12. The structure of claim 1, wherein the respective arcuate elements are of tubular designs.

13. The structure of claim 1, wherein the respective arcuate elements are segmented and comprise interconnected cylinder segments.

14. The structure of claim 1, wherein the respective arcuate elements are tilted radially inward in the direction of a longitudinal center axis of the transition piece.

15. The structure of claim 1, wherein the convex end portions of the respective arcuate elements can be brought to bear tangentially on the tower component.

16. The structure of claim 1, wherein the convex end portions of the respective arcuate elements are arranged in a plane parallel to the longitudinal center axis of the transition piece.

17. The structure of claim 2, wherein the respective arcuate elements are of tubular design.

18. The structure of claim 2, wherein the respective arcuate elements are segmented and comprise interconnected cylinder segments.

19. The structure of claim 2, wherein the respective arcuate elements are tilted radially inward in the direction of a longitudinal center axis of the transition piece.

20. The structure of claim 2, wherein the convex end portions of the respective arcuate elements can be brought to bear tangentially on the monopile.

21. The structure of claim 2, wherein the convex end portions of the respective arcuate elements are arranged in a plane parallel to the longitudinal center axis of the transition piece.

22. The structure of claim 2, wherein the transition piece further comprises a cladding for closing an interspace between mutually adjacent convex portions of the arcuate elements and an outer surface of the monopile.

23. The structure of claim 2, wherein the connecting structure comprises at least three columns, and the legs of the arcuate elements are configured to connect directly or indirectly with the columns of the connecting structure.

24. The structure of claim 2, wherein the connecting device is a connecting flange.

25. The structure of claim 2, wherein the legs of the respective arcuate elements are tilted radially inward in the direction of a longitudinal center axis of the transition piece.

* * * * *